Jan. 19, 1932. P. E. MATTHEWS 1,842,039
VIBRATION DAMPER
Filed Nov. 22, 1929
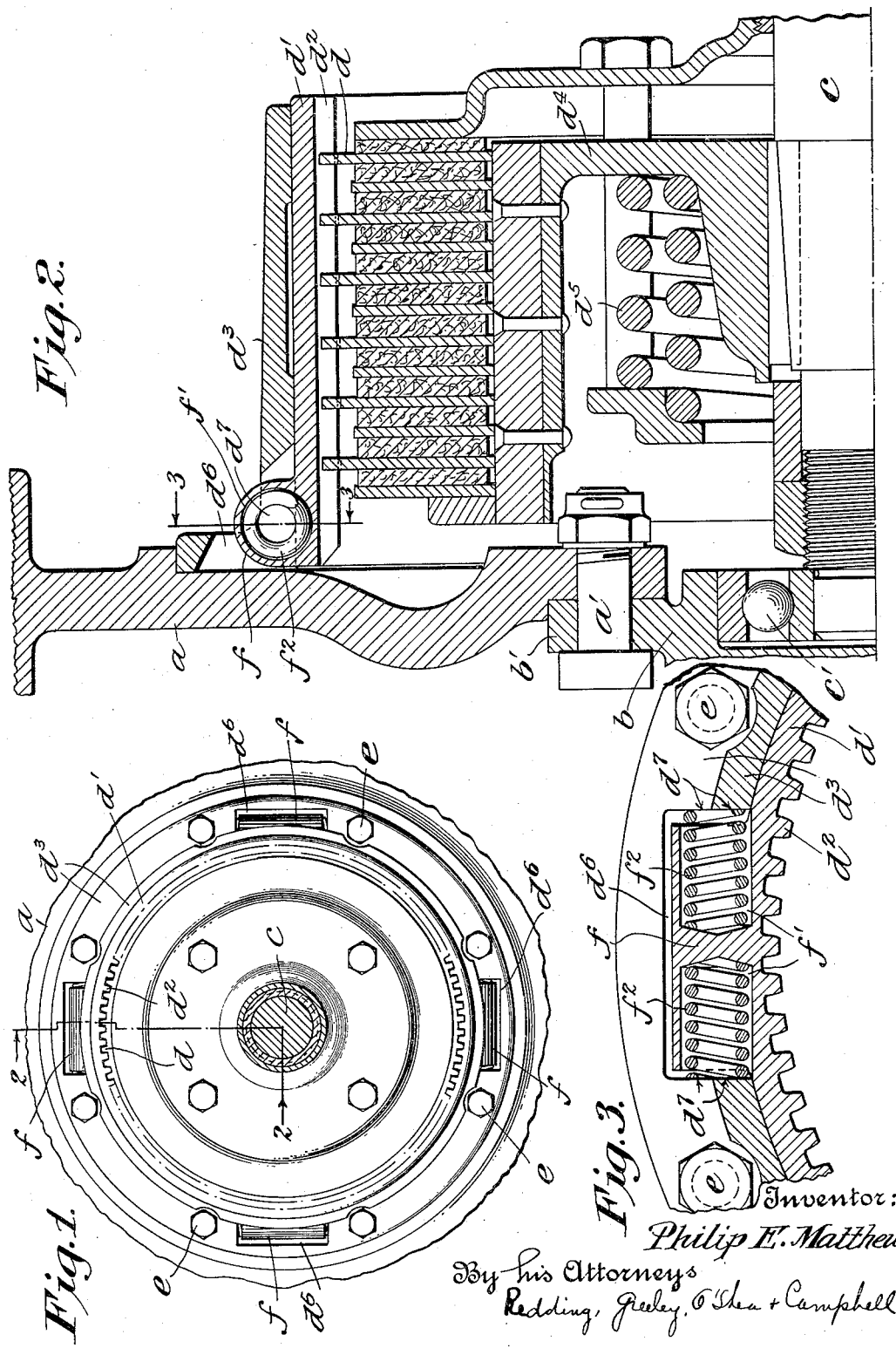
Inventor:
Philip E. Matthews
By his Attorneys
Redding, Greeley, O'Shea & Campbell Patented Jan. 19, 1932

1,842,039

UNITED STATES PATENT OFFICE

PHILIP E. MATTHEWS, OF PLAINFIELD, NEW JERSEY, ASSIGNOR TO INTERNATIONAL MOTOR COMPANY, OF NEW YORK, N. Y., A CORPORATION OF DELAWARE

VIBRATION DAMPER

Application filed November 22, 1929. Serial No. 408,971.

The present invention relates to vibration dampers and embodies, more specifically, a device for damping the torsional vibration of multiple disc clutches.

It has been found that, in the conventional type of automotive vehicle, a great deal of undesirable vibration is transmitted from the engine to the gear box. These vibrations cause, at times, a very annoying periodic chatter in the transmission. Not only is the chatter annoying but the effect of this condition upon the mechanism is undesirable since the parts thereof are subjected to periodic strains varying materially during operation.

To remedy this condition the present invention has been designed, one objective thereof being to cushion the fluctuating torque of the engine which is transmitted from the crank shaft thereof to the gear box. Such device is incorporated in the clutch mechanism and is readily applied thereto without impairing the serviceability or operation of any of the members.

An object of the invention, accordingly, is to provide a device for cushioning and damping the vibration of the engine crank shaft which is transmitted through the clutch to the gear box.

A further object of the invention is to cushion the fluctuating torque of the engine crank shaft by incorporating in the clutch mechanism a simple and effective vibration damper.

Further objects, not specifically enumerated above, will be apparent as the invention is described in greater detail in connection with the accompanying drawings, wherein:

Figure 1 is a view in elevation, taken in a plane transverse to the drive shaft, and showing a clutch provided with the vibration damping means of the present invention.

Figure 2 is a view in section, taken on line 2—2 of Figure 1, and looking in the direction of the arrows.

Figure 3 is a view in section, taken on line 3—3 of Figure 2, and looking in the direction of the arrows.

Referring to the above drawings, the flywheel of a motor vehicle is shown at $a$. This flywheel is mounted upon the end of a crank shaft $b$ upon which a flange $b'$ is formed, bolts $a'$ serving to secure the flywheel to the flange. A shaft $c$ transmits the drive to the gear box, the forward end of this shaft being journaled in a bearing $c'$, formed in the end of the crank shaft $b$.

A multiple disc construction is shown, wherein the discs are indicated at $d$, keyed to the clutch drum $d'$ by means of suitable interengaging keys $d^2$.

An outer drum $d^3$ mounts the drum $d'$, the drum $d'$ floating within the outer drum $d^3$. The driven member $d^4$ of the clutch is keyed to the shaft $c$ and the desired pressure maintained upon the plates and friction discs by means of a spring $d^5$.

Suitable bolts $e$ secure the outer drum $d^3$ to the flywheel $a$, spaced recesses $d^6$ being formed in the outer drum with opposed seats $d^7$. Suitable extensions $f$ are formed about the periphery of the drum $d'$ so that they may be received within the recesses $d^6$. These extensions are formed with coaxial recesses $f'$ which receive springs $f^2$. These springs seat within the extensions $f$ and against the opposed seats $d^7$. The clearance provided between the ends of the extensions $f$ and the opposed seats $d^7$ regulate the angular motion of the drum $d'$ with respect to the drum $d^3$. It will be seen that the fluctuating torque of the engine crank shaft will be effectively cushioned by means of the springs $f^2$ which transmit the drive from the flywheel to the clutch driving member. While the invention has been described with specific reference to the clutch construction, flywheel mounting, and associated parts as shown in the accompanying drawings, it is not to be limited, save as defined in the appended claim.

I claim as my invention:

In a clutch mechanism and means for driving the same, a cylindrical drive transmitting sleeve, a cylindrical clutch driving member floating in the sleeve, recesses in the sleeve, extensions in the clutch member received in the recesses, coaxial recesses in the extensions, and springs in the last named recesses for engaging the sides of the first recesses.

This specification signed this 29th day of October, A. D. 1929.

PHILIP E. MATTHEWS.